Patented Mar. 11, 1941

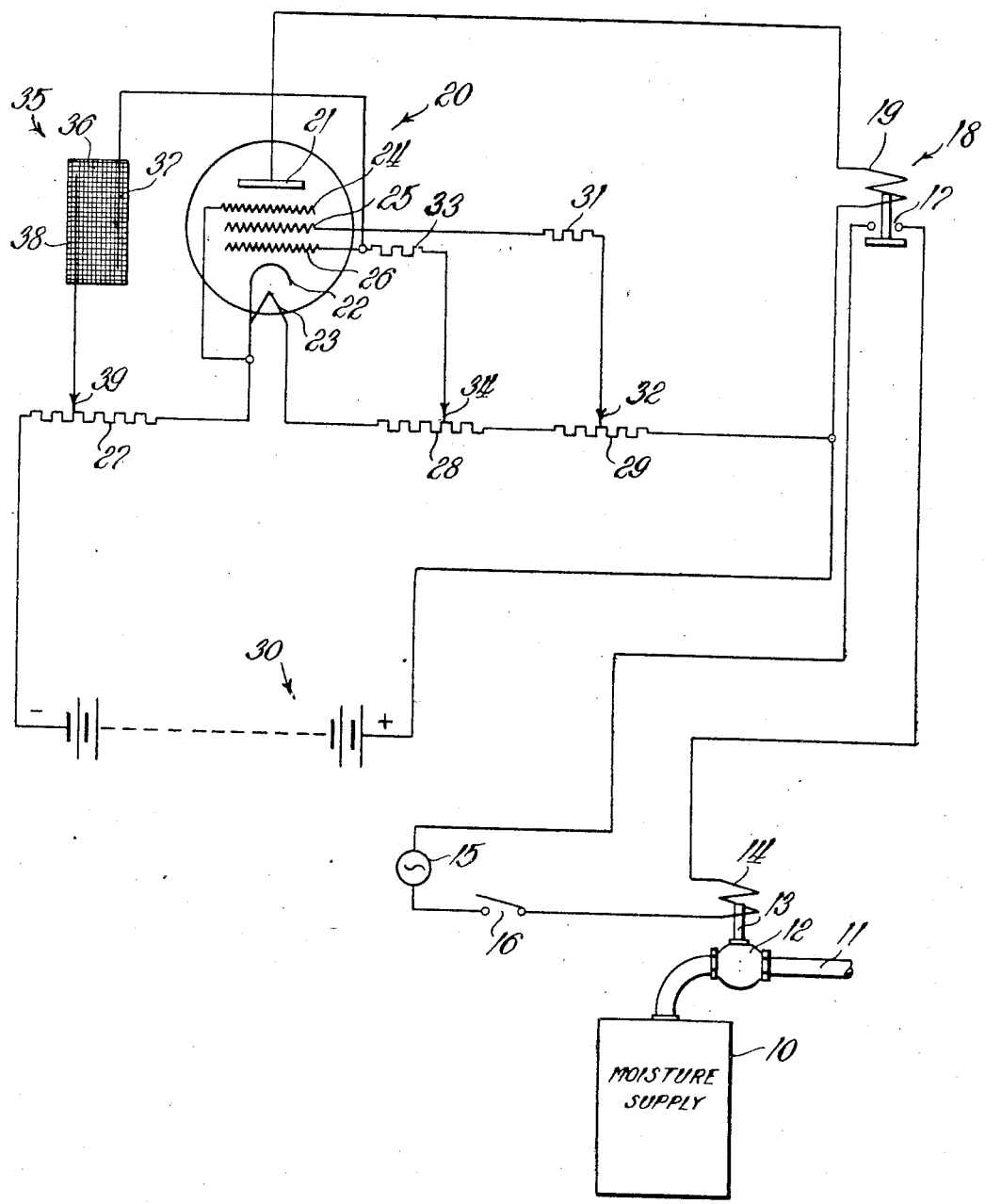

2,234,858

UNITED STATES PATENT OFFICE 2,234,858

HUMIDITY CONTROL APPARATUS

Kenneth C. Brown, Evanston, and Fredric J. Weyher, Chicago, Ill.; said Weyher assignor to said Brown Application December 16, 1938, Serial No. 246,013

2 Claims. (Cl. 236—44)

Our invention relates generally to electrical control systems, and it has particular relation to humidity control systems.

The object of our invention, generally stated, is to provide a humidity control system that shall be simple and efficient in operation and which may be readily and economically manufactured and installed.

An object of our invention is to accurately control the humidity of a space in a new and improved manner.

Another object of our invention is to vary the conductivity of the control circuit of an electric valve in accordance with the change in humidity of a space for in turn controlling the amount of moisture supplied thereto.

Still another object of our invention is to impregnate a wick with a material the electrical conductivity of which varies in accordance with change in humidity, and to employ the same for controlling the amount of moisture supplied to a space in accordance with the humidity thereof.

A further object of our invention is to provide a humidity sensitive device by impregnating a wick having a pair of spaced apart electrodes therein with a conducting solution.

Other objects of our invention will in part be obvious and in part appear hereinafter.

According to our invention, we provide a grid controlled electric valve for controlling the operation of a relay which is connected to control the energization of an electrically operated valve in a supply line leading from a moisture supply to a space the humidity of which is to be controlled. The conductivity of the electric valve is controlled in accordance with change in humidity of the space to effect the desired control. The humidity sensitive means comprises, preferably, a cotton wick, such as a lamp wick, having a pair of platinum electrodes in spaced relation therein. The wick with the electrodes is impregnated with a sodium chloride solution and dried. The conductivity of the impregnated wick is extremely sensitive to changes in humidity of the space. When this device is connected to the control electrode of the electric valve an accurate and efficient means is provided for controlling its conductivity and thereby the humidity of the space to maintain the same at a predetermined humidity.

For a more complete understanding of the nature and scope of our invention reference may be had to the following detailed description taken in connection with the accompanying drawing in which the single figure illustrates diagrammatically a concrete embodiment of our invention.

Referring now to the drawing, it will be observed that the reference character 10 designates a moisture supply which is connected by a suitable pipe or conduit 11 to supply moisture to a space the humidity of which is to be controlled. A valve 12 is provided in the pipe 11 having an armature 13 that is arranged to be moved by an operating winding 14. When the winding 14 is energized the armature 13 is moved to such position that the valve 12 is opened.

The operating winding 14 may be energized from a suitable current source, such as the source 15 of alternating current. A manually operable switch 16 is provided in the circuit between the operating winding 14 and the source 15. Under normal operating conditions switch 16 is closed. The energization of the operating winding 14 is normally controlled by the opening and closing of contact members 17 of a suitable relay, shown generally at 18, that is provided with an operating winding 19.

With a view to controlling the energization of the operating winding 19 an electric valve, shown generally at 20, is provided. It will be noted that the electric valve 20 is provided with an anode 21, a cathode 22, heated by a heater 23, a suppressor grid 24, a screen grid 25, and a control grid 26. The heater 23 is connected in series circuit relation with voltage dividing resistors 27, 28 and 29 that are connected across a suitable direct current source, such as a battery, shown generally at 30.

The screen grid 25 is connected through a resistor 31 and a slider 32 to the voltage dividing resistor 29. The slider 32 is adjusted to such position on the resistor 29 that the electric valve is rendered conducting and sufficient current flows through the operating winding 19 of the relay 18 to close contact members 17. A biasing potential is applied to the control grid 26 through resistor 33 from a point along the voltage dividing resistor 28 that is determined by the slider 34.

The conductivity of the electric valve 20 is controlled in accordance with the humidity of the space to which moisture is supplied through the pipe 11. For this purpose humidity responsive means, shown generally at 35, is provided in this space in such position that the humidity thereat is representative of the humidity of the space. The humidity responsive means 35 comprises a cotton wick 36, such as a lamp wick, in which are threaded electrodes 37 and 38 in spaced apart relation and preferably formed of platinum. The electrode 37 is connected to the control electrode 26 while the electrode 38 is connected by a slider 39 to the voltage dividing resistor 27.

In order to render the wick 36 sensitive to changes in humidity of the space it is impregnated with a solution of sodium chloride or common table salt. After the wick 36 is thoroughly saturated, it is dried. The conductivity of the wick 36 is then variable in accordance with the moisture of the space, decreasing with decrease in moisture content and increasing with increase in moisture content.

The slider 39 is adjusted along the resistor 27 to such position that when the humidity of the space is at the desired value the electric valve 20 will be reduced in conductivity to such point that the operating winding 19 of the relay 18 is unable to hold contact members 17 closed. As a result, the winding 14 is deenergized and the valve 12 is closed. Now, when the moisture content of the space decreases, the conductivity of the wick 36 between the electrodes 37 and 38 correspondingly decreases, with the result that the electric valve 20 again becomes sufficiently conducting as to permit sufficient current to flow through the operating winding 19 of the relay 18 to close contact members 17, and the winding 14 is again energized. The valve 12 is then opened to again supply moisture to the space through the pipe 11 from the supply 10.

Since it will be obvious that certain changes may be made in the foregoing circuit connections and construction without departing from the spirit and scope of our invention, it is intended that all matter shown in the accompanying drawing and described hereinbefore shall be interpreted as illustrative and not in a limiting sense.

We claim as our invention:

1. A humidity responsive element comprising a cotton wick which has been impregnated with a salt solution including sodium chloride and dried, and a plurality of platinum wire electrodes threaded into said impregnated wick in spaced relation therewith, and arranged to be connected externally to an electrical circuit, said wick being freely exposed to the atmosphere in a space wherein the electrical conductivity of the impregnated wick between said electrodes varies in accordance with the humidity of said atmosphere.

2. A humidity responsive element comprising a cotton wick which has been impregnated with a salt solution including sodium chloride and dried, a plurality of platinum wire electrodes attached to said impregnated wick in spaced relation therewith and arranged to be connected externally to an electrical circuit, said wick being freely exposed to the atmosphere in a space wherein the electrical conductivity of the impregnated wick between said electrodes varies in accordance with the humidity of said atmosphere.

KENNETH C. BROWN.
FREDRIC J. WEYHER.